(12) United States Patent
Seidensticker (10) Patent No.: US 12,012,277 B2
(45) Date of Patent: Jun. 18, 2024

(54) PACKAGING APPARATUS, PACKAGING, PRODUCT, AND METHOD FOR PACKAGING AN ITEM

(71) Applicant: Robert Bosch GmbH, Stuttgart (DE)

(72) Inventor: Oliver Seidensticker, Stutensee (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/960,282

(22) Filed: Oct. 5, 2022

(65) Prior Publication Data

US 2023/0112643 A1 Apr. 13, 2023

(30) Foreign Application Priority Data

Oct. 7, 2021 (DE) .......................... 102021211333.8

(51) Int. Cl.
*B65D 85/68* (2006.01)
*B65D 77/04* (2006.01)

(52) U.S. Cl.
CPC ............ *B65D 85/68* (2013.01); *B65D 77/04* (2013.01); *B65D 2585/6885* (2013.01)

(58) Field of Classification Search
CPC . B65D 77/04; B65D 85/68; B65D 2585/6885
USPC .......................... 206/459.5; 229/87.01–87.15
See application file for complete search history.

(56) References Cited

U.S. PATENT DOCUMENTS

| | | | | |
|---|---|---|---|---|
| 3,187,987 A | * | 6/1965 | Langdon | B65D 75/14 229/87.16 |
| 4,365,738 A | * | 12/1982 | Densen | B65D 5/22 206/459.5 |
| 7,992,712 B2 | * | 8/2011 | Rosland | D06F 89/005 229/87.01 |
| 9,567,152 B2 | * | 2/2017 | Putnam | B65D 85/68 |
| 2014/0069847 A1 | * | 3/2014 | Kim | B65D 5/4208 206/784 |
| 2014/0262863 A1 | * | 9/2014 | Fournier | B65D 85/68 206/223 |
| 2015/0297296 A1 | * | 10/2015 | Stauder | B65D 5/5028 206/370 |
| 2017/0224435 A1 | * | 8/2017 | Godfrey | A61B 50/33 |

* cited by examiner

*Primary Examiner* — Bryon P Gehman
(74) *Attorney, Agent, or Firm* — Michael Best & Friedrich LLP (57) ABSTRACT

A packaging apparatus (10*a*; 10*b*), in particular a wiper blade packaging apparatus, for packaging at least one item (12*a*, 26*a*, 30*a*, 34*a*), in particular at least one wiper blade adapter (14*a*, 28*a*, 32*a*, 36*a*), with a packaging element (16*a*; 16*b*) for accommodating the at least one item (12*a*, 26*a*, 30*a*, 34*a*). It is proposed that the packaging element (16*a*; 16*b*) be configured as a user guide (18*a*).

14 Claims, 5 Drawing Sheets

PACKAGING APPARATUS, PACKAGING, PRODUCT, AND METHOD FOR PACKAGING AN ITEM

BACKGROUND

A packaging apparatus, in particular a wiper blade packaging apparatus, for packaging at least one item, in particular at least one wiper blade adapter, with a packaging element for accommodating the item, has already been proposed.

SUMMARY

The invention proceeds from a packaging apparatus, in particular a wiper blade packaging apparatus, for packaging at least one item, in particular at least one wiper blade adapter, with a packaging element for accommodating the item.

It is proposed that the packaging element be configured as a user guide.

A "packaging apparatus" is intended to mean at least a part of a packaging. The packaging apparatus can also comprise the entire packaging. Preferably, the item is an accessory and/or replacement part for a means of transportation, in particular a motor vehicle, for example an automobile or truck or motorcycle, or a bicycle, in particular an e-bike and/or Pedelec. Particularly preferably, the item is a wiper blade adapter for a windscreen wiper of a motor vehicle. Alternatively, it is also conceivable that the item is a different accessory and/or replacement part for a windscreen wiping system of a motor vehicle, for example a wiper blade and/or a wiper frame and/or a windscreen wiper linkage and/or a windscreen washer nozzle or another accessory and/or replacement part for a windscreen wiping system of a vehicle, without being limited to the aforementioned examples. The item could also alternatively be another accessory and/or replacement part for a motor vehicle, for example a body panel and/or a lighting element, for example a headlight and/or a rear light and/or a turn signal and/or the like, and/or a mirror and/or a mirror cap and/or a component of an ignition and/or sparking system, for example a spark plug and/or a glow plug and/or an ignition coil, and/or an accessory and/or replacement part for the electrical system of a motor vehicle, for example a switch and/or a fuse and/or a sensor and/or the like. It is also conceivable that the item is an accessory for a bicycle, in particular an e-bike and/or Pedelec, for example a bicycle lighting and/or a reflector and/or a speedometer and/or a pedal and/or a bicycle hose and/or a bicycle bell and/or the like. Further, a packaging of further items not mentioned above, in particular items that are not accessory and/or replacement parts for a means of transportation, is also conceivable by means of the packaging apparatus.

A "packaging element" is intended to mean an element for packaging the at least one item, which surrounds the item in a packaged state at least in a majority, preferably entirely. In the packaged state, the packaging element surrounds the item such that at least the surfaces of the item, which are aligned at least substantially parallel to a main direction of extension of the item, are surrounded by the packaging element. A "main direction of extension" of an object is to be understood as a direction which runs parallel to a longest edge of a smallest geometrical cuboid which just completely encloses the object. Preferably, in the packaged state, the packaging element surrounds the item to a proportion of at least 75%, in particular at least 80%, advantageously at least 85%, particularly advantageously at least 90%, preferably at least 95%, and more preferably at least 99% of an overall surface of the item. Preferably, the packaging apparatus comprises at least one sealing element for sealing the packaging element. The sealing element is provided in order to close the packaging element in a packaged state in which the at least one item is accommodated in the packaging element and is surrounded by the packaging element at least in a majority, in particular releasably, and to secure the item against undesirable dislodging from the packaging element, for example during transport. The closure element could be provided in order to close the packaging element by means of a form-fit and/or friction-locking connection. For example, the closure element could be configured as a tensioning elastic. Preferably, the sealing element is formed from paper and/or paperboard and has the shape of a cylinder jacket with an internal cavity in which the packaging element can be inserted and closed along with the at least one item accommodated therein. The sealing element could alternatively also be provided for sealing the packaging element by means of a material-locking connection, in particular by means of an adhesive connection. For example, the packaging element could be configured as at least one adhesive strip applied to a partial region of the packaging element or as an adhesive strip formed separately from the packaging element, for example as a piece of adhesive tape or the like.

A "user guide" is intended to mean a written and/or pictorial representation of at least one instruction to a user of the item pertaining to the item. The user guide can include, but is not limited to, item-related assembly instructions and/or operating instructions and/or safety instructions and/or disposal instructions and/or the like.

In the present document, numeral words such as "first" and "second" which precede certain terms are merely used in order to distinguish objects and/or assign objects to one another and do not imply an existing total number and/or ranking of the objects. In particular, a "second object" does not necessarily imply the presence of a "first object."

"Provided" is to be understood as meaning specially designed and/or specially equipped. When an object is provided for a particular function, this is to be understood as meaning that the object fulfills and/or performs that particular function in at least one usage and/or operating state.

Efficiency can advantageously be improved by the design of the packaging apparatus according to the invention. In particular, a material and/or cost efficiency can be improved by using a user guide that is already available for many items, which has previously been attached separately, as a packaging element for accommodating the item. In addition, compared to previously known packaging in which a user guide is contained and in which an item is packaged in an additional packaging element, for example made of plastic or paperboard, a more sustainable and resource-conserving packaging solution can be provided. In addition, an accumulation of packaging waste can be advantageously reduced. A particularly modern packaging apparatus, which corresponds to an increased sustainability awareness of many users, can thus be provided.

Further, it is proposed that the user guide be configured as an assembly guide. In doing so, an efficiency can advantageously be further improved, because an assembly guide that already exists for many items, in particular for wiper blade adapters, can be used as a packaging element. Thus, advantageously, a material and/or resource efficiency can be further improved. In addition, a cost efficiency can be advantageously further improved by the omission of an additional packaging element. The user guide configured as the assembly guide contains assembly instructions to the user for the assembly of the item and/or for the assembly of the item on or with at least one further item. In the case of an item configured as a wiper blade adapter, the assembly guide contains instructions for assembling a wiper blade by means of the wiper blade adapter on a windscreen wiping system of a motor vehicle. In the event that a plurality of items, for example a plurality of wiper blade adapters of different adapter types, are accommodated in the packaging element, the assembly guide preferably contains different assembly instructions for assembling the items.

In addition, it is proposed that the packaging element be formed at least in part, preferably in a majority, of fibrous material. Such a configuration can advantageously provide a packaging apparatus with improved sustainability, in that the packaging element is formed from renewable and/or recycled raw materials. In addition, a packaging element with particularly advantageous packaging properties, for example an improved protection of the item against damage during transport, can be provided. Furthermore, a particularly modern and sustainable packaging can be provided, because the use of plastic can be omitted when the packaging element is at least partially formed from fibrous material. In this context, "fibrous material" is to be understood to mean a material obtained from plant-based starting materials, in particular wood, and/or recycled from products from plant-based starting materials. For example, the fibrous material can be pulp, in particular cellulose, and/or wood materials and/or waste paper materials. The packaging element is formed from fibrous material in a proportion of at least 30% by weight. In particular, the packaging element is formed at least in a majority of over 50% by weight, advantageously over 60% by weight, particularly advantageously over 70% by weight, preferably over 80% by weight, and more preferably over 90% by weight, of fibrous material. The packaging element could comprise further constituents in addition to the fibrous material. For example, it is conceivable that the packaging element comprises a protective shell made of a material of fibrous material, for example a plastic, in which a base body of the packaging element, which consists of at least a majority of fibrous material, is wrapped and/or sealed. Preferably, the packaging element is made entirely of fibrous material, except for the printing materials such as ink and/or toner and/or the like, with which user instructions are printed on the packaging element. The packaging element could be formed at least in part, preferably in a majority, from cardboard and/or paperboard. However, in a particularly preferred configuration, it is proposed that the packaging element be at least partially formed from paper, preferably in a majority. This can advantageously reduce the use of material in the manufacture of the packaging element, in particular compared to packaging elements made of paperboard and/or cardboard, and thus further improve resource efficiency. A particularly compact and flexible packaging element can also be advantageously provided.

The packaging element could be configured as a folding package and could, for example, form an accommodating space that can be created by folding the packaging element. In an advantageous configuration, however, it is proposed that the packaging element be configured as a wrap-around packaging. Such a configuration can achieve a particularly simple and flexible packaging of the at least one item. In particular, items of different shapes and/or sizes can be packaged particularly simply and flexibly. A "wrap-around packaging" is intended to mean a packaging element in which the at least one item can be wrapped, in particular by hand and without other tools.

The packaging element could be configured as an outer packaging and can form in particular the entire packaging of the at least one item. In an advantageous configuration, however, it is proposed that the packaging element be configured as an inner packaging and/or accessory packaging. Such a configuration can achieve particularly a simple and secure packaging of the item. The packaging element configured as an inner packaging and/or accessory packaging is provided in order to be accommodated in an outer packaging. The outer packaging could be a part of the packaging apparatus. Preferably, the outer packaging is a part of a packaging comprising the packaging apparatus. The outer packaging could be provided for accommodating, in particular exclusively, the packaging element configured as the inner packaging along with the at least one item accommodated therein. It is also conceivable that the outer packaging is provided in order to accommodate the packaging element configured as the accessory packaging along with the at least one item accommodated therein, and at least one further item not accommodated in the packaging element.

The invention further relates to a packaging, in particular a wiper blade packaging, having a packaging apparatus according to any of the above-described configurations. Such a packaging is particularly characterized by advantageous properties in terms of its efficiency and sustainability. The packaging comprises the packaging apparatus and an outer packaging for accommodating the packaging element along with the at least one item. The outer packaging could be formed from a plastic, for example a film made of polyethylene (PE) and/or polypropylene (PP) and/or polyvinyl chloride (PVC) and/or polystyrene (PS) and/or polycarbonate (PC). Preferably, the outer packaging is formed from fibrous material, in particular paper and/or paperboard.

The invention also relates to a product, in particular a wiper blade product, with a packaging apparatus according to any of the above-described configurations and with the item accommodated in the packaging element. In addition to advantageous product properties, such a product is characterized in particular by its efficient and resource-conserving packaging by means of the packaging apparatus. The product comprises at least the packaging apparatus and the at least one item accommodated in the packaging element, and can further comprise the packaging and/or at least one wiper blade and/or further items.

Further, it is proposed that the item be a wiper blade adapter. This can advantageously provide a particularly sustainable wiper blade product.

It is also proposed that the product comprise a further item accommodated in the packaging element. This can advantageously further improve a material and/or resource efficiency of the product by having a plurality of items accommodated together in the packaging element. In addition, a particularly flexible product with a wide field of application can be advantageously provided.

The item and the further item could be unrelated items. For example, it is conceivable that the item is a first accessory and the further item is a further accessory, which can be used in combination with the accessory. In an advantageous embodiment, however, it is proposed that the item and the further item are related. Such a configuration can advantageously provide a particularly flexible product with a high user comfort. Preferably, the item and the further item related to the item can be used alternatively to one another. In addition, it is proposed that the further item be a further wiper blade adapter. As a result, a particularly flexible wiper blade product can be provided. Preferably, the item configured as a wiper blade adapter is a wiper blade adapter of a first adapter type for assembling a wiper blade on a first type of windscreen wiping system of a first motor vehicle model and the further item configured as a further wiper blade adapter is a related wiper blade adapter of a second adapter type that is different from the first adapter type for assembling the wiper blade on a second type of windscreen wiping system of a second motor vehicle model that is different from the first motor vehicle model, said second type being different from the first type of windscreen wiping system.

The invention further proceeds from a method of packaging at least one item, in particular at least one wiper blade adapter, with a packaging apparatus, in particular according to any of the above-described configurations.

It is proposed that the item be packaged by means of a user guide. Such a configuration can advantageously provide a particularly efficient and sustainable method of packaging at least one item. Also advantageously, a particularly simple method for packaging the at least one item, which can be performed without further tools, can be provided.

The packaging apparatus according to the invention and the method according to the invention for packaging the at least one item are not intended to be limited to the applications and embodiments described above. In particular, the packaging apparatus according to the invention can have a number of individual elements, components, and units, and the method can have a number of method steps, that differs from the number mentioned herein in order to fulfill a function described herein. Furthermore, in the value ranges given in this disclosure, values lying within the limits mentioned herein are also intended to be considered as disclosed and usable as desired.

BRIEF DESCRIPTION OF THE DRAWINGS

Further advantages arise from the following drawing description. In the drawing, two exemplary embodiments of the invention are shown. The drawing, the description, and the claims contain numerous features in combination. The person skilled in the art will expediently also consider the features individually and will combine them into meaningful further combinations.

The following are shown.

DETAILED DESCRIPTION

Figure 1:
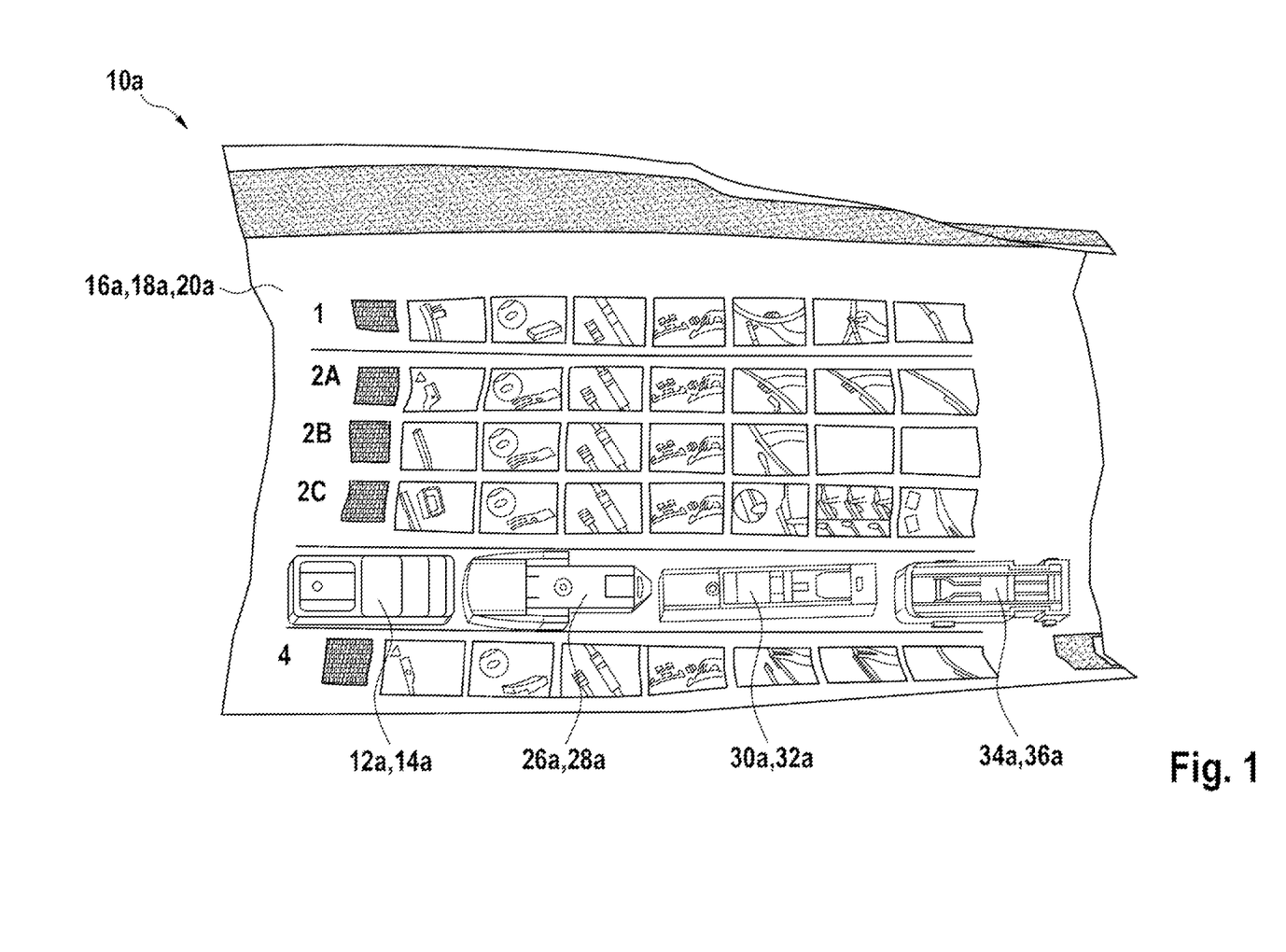
FIG. 1 a schematic illustration of a packaging apparatus for packaging at least one item, with a packaging element for accommodating the item, FIG. 2 a schematic representation of a product with the packaging apparatus and with the item, wherein the item is accommodated in the packaging element, FIG. 3 a packaging with the packaging apparatus in two schematic representations, FIG. 4 a schematic method flowchart for representing a method for packaging at least one item, and FIG. 5 a further exemplary embodiment of a packaging having a packaging apparatus for packaging at least one item in a schematic representation.

FIG. 1 shows a packaging apparatus 10a for packaging at least one item 12a in a schematic representation. In the present case, the packaging apparatus 10a is configured as a wiper blade packaging apparatus. In the present case, item 12a is a wiper blade adapter 14a of a first adapter type for assembling a wiper blade 40a (cf. FIG. 3) on a first type of windscreen wiping system (not shown) of a first motor vehicle model (not shown).

The packaging apparatus 10a comprises a packaging element 16a for accommodating the item 12a. The packaging element 16a is configured as a user guide 18a. In the present case, the user guide 18a is configured as an assembly guide 20a. The assembly guide 20a includes assembly instructions for assembling the wiper blade 40a on the windscreen wiping system of the first type of the first motor vehicle model by means of the wiper blade adapter 14a.

The packaging element 16a is at least partially formed from fibrous material, for example cellulose. In the present case, the packaging element 16a is formed from fibrous material in a majority of at least 75% by weight.

The packaging element 16a is at least partially formed from paper. In the present case, the packaging element 16a is formed of paper in a majority of at least 75% by weight.

In the present exemplary embodiment, the packaging element 16a is provided for accommodating a further item 26a. The item 12a and the further item 26a are related items. The further item 26a is a further wiper blade adapter 28a. The further wiper blade adapter 28a is a second adapter type that is different from the wiper blade adapter 14a of the first adapter type and is provided for assembling the wiper blade 40a on a second type of windscreen wiping system (not shown) of a second motor vehicle model (not shown) that is different than the first type. The packaging element 16a configured as an assembly guide 20a also includes assembly instructions for assembling the wiper blade 40a by means of the first further wiper blade adapter 28a on the windscreen wiping system of the second type.

The packaging element 16a is also provided for accommodating a further item 30a, which is a further wiper blade adapter 32a of a third adapter type for assembling the wiper blade 40a to a third type of windscreen wiping system (not shown) of a third motor vehicle model (not shown), said third type being different from the first and second type, and for accommodating a further item 34a, which is a further wiper blade adapter 36a of a fourth adapter type for assembling wiper blade 40a to a fourth type of windscreen wiping system (not shown) of a fourth motor vehicle model (not shown), said third type being different from the first, second, and third type. The packaging element 16a configured as an assembly guide 20a also includes assembly instructions for assembling the wiper blade 40a by means of the further wiper blade adapter 32a or the further wiper blade adapter 36a on a windscreen wiping system of the third or fourth type.

The packaging element 16a is configured as a wraparound packaging. To accommodate the item 14a and the further items 26a, 30a, 32a, they can be placed on the packaging element 16a and then wrapped into the packaging element.

Figure 2:
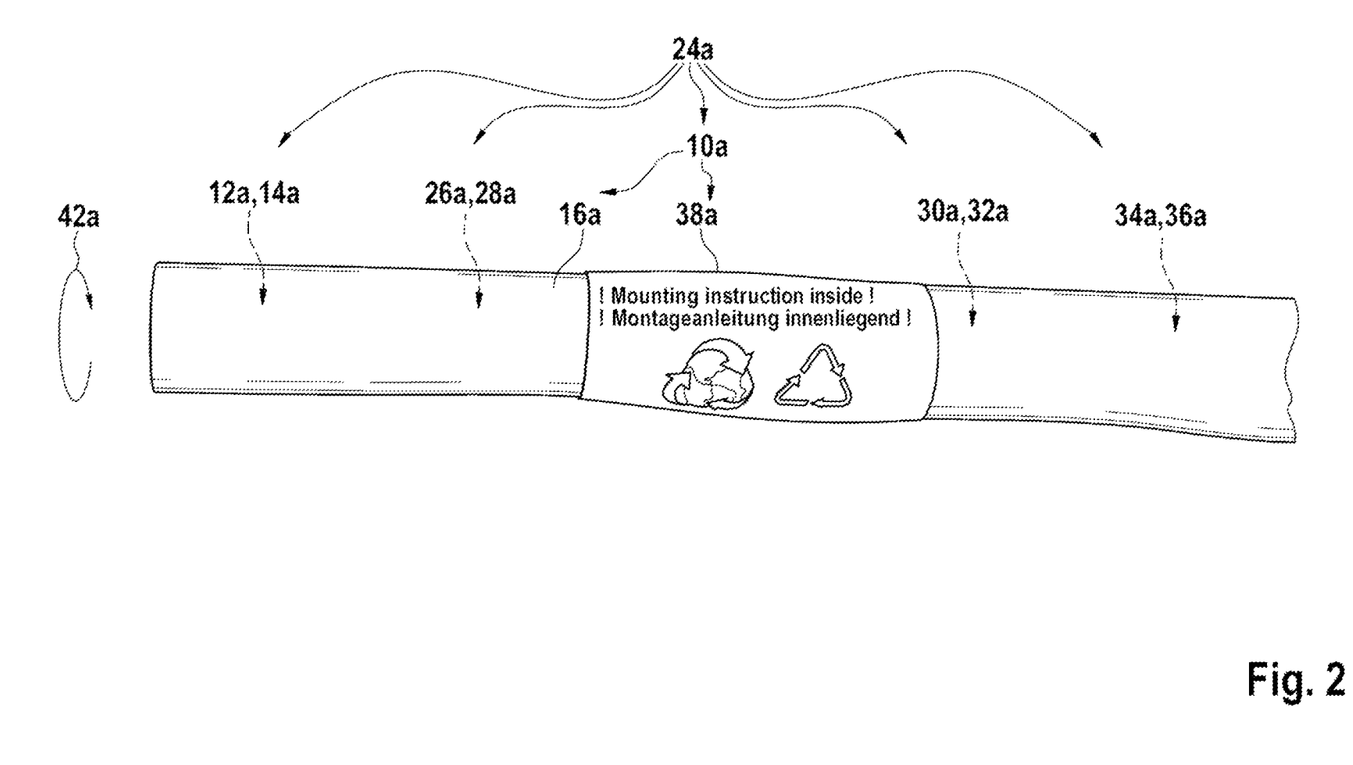

FIG. 2 shows a schematic representation of a product 24a with the packaging apparatus 10a and with the item 12a, which is accommodated in the packaging element 16a. The product 24a is a wiper blade product, namely a wiper blade adapter product. In the present case, in addition to the item 12a, which is the wiper blade adapter 14a, the product 24a also comprises the further item 26a, which is the further wiper blade adapter 28, the further item 30a, which is the further wiper blade adapter 32a, and the further item 34a, which is the further wiper blade adapter 36a. The further items 26a, 30a, 34a are also accommodated in the packaging element 16a.

The packaging apparatus 10a comprises a closure element 38a for sealing the packaging element 16a in a packaged state when the item 12a and the further items 26a, 30a, 34a are accommodated and wrapped in the packaging element 16a. In the packaged state, the closure element 38a surrounds the packaging element 16a along a circumferential direction 42a, thereby preventing the item 12a and/or the further items 26a, 30a, 34a from becoming unwrapped. In the present case, the packaging element 16a surrounds the item 12a and the further items 26a, 30a, 34a in the packaged state at least in a majority, namely such that at least a portion of 75% of an overall surface of the item 12a and at least a portion of 75% of the overall surfaces of the further items 26a, 30a, 34a are surrounded by the packaging element 16a. The closure element 38a is provided in order to close the packaging element by means of a form-fit and/or friction-locking connection. In the present case, the closure element is cylindrical in shape, such that the packaging element 16a configured as a wrap-around packaging can be inserted into the closure element 38a along with the item 12a and the further items 26a, 30a, 34a accommodated therein. The closure element 38a is configured to be at least 75% by weight of fibrous material, namely paper. The closure element 38a contains a printed reference to the assembly guide 20a arranged therein (cf. FIG. 1).

Alternatively, however, the packaging apparatus 10a could also comprise a closure element that is configured as a tensioning elastic. Alternatively, it is also conceivable that the closure element 38a is provided for closing the packaging element 16a by means of a material-locking connection and is configured, for example, as an adhesive strip or the like (not shown).

Figure 3:
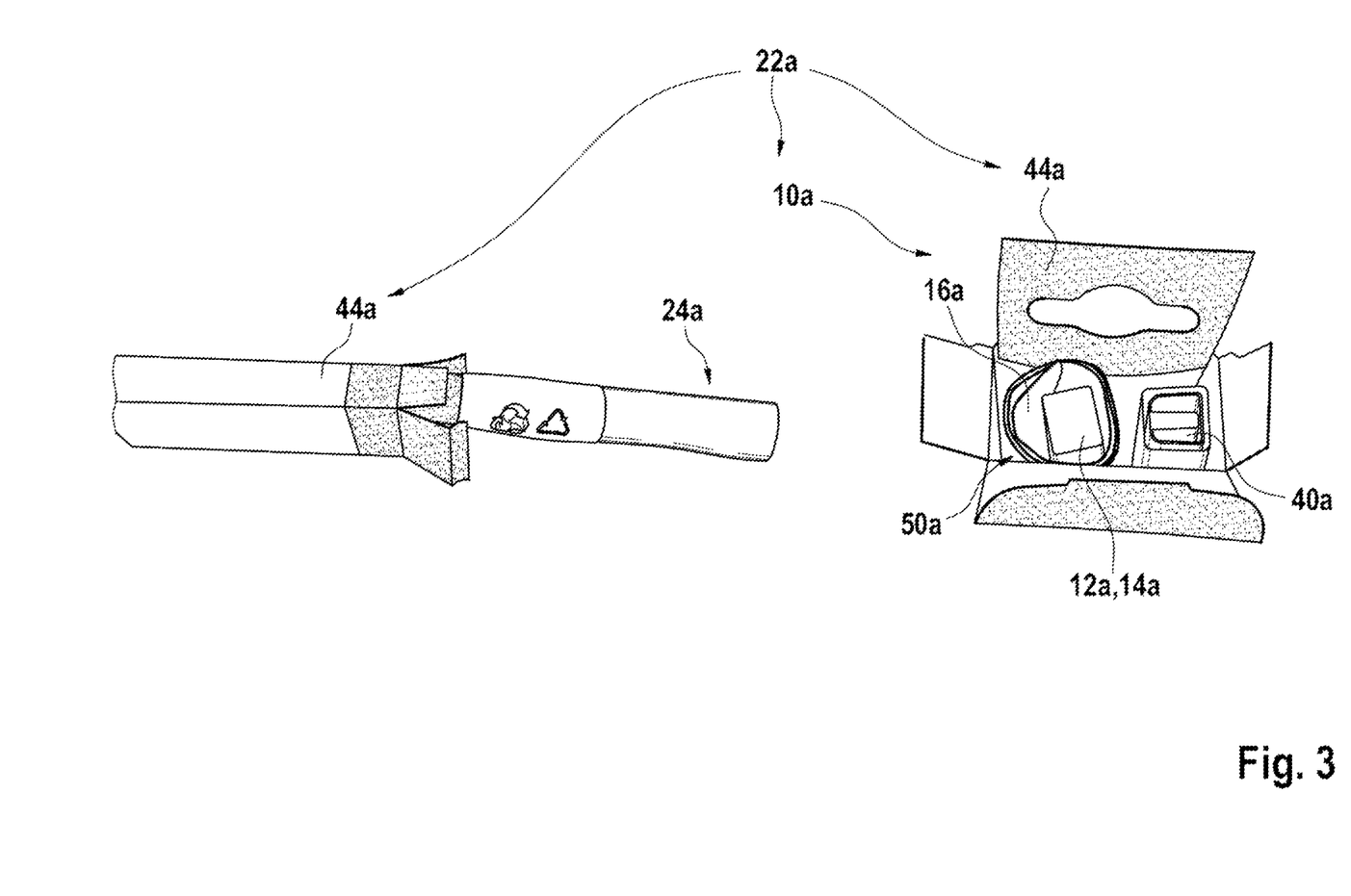

FIG. 3 shows a packaging 22a with a packaging apparatus 10a in two schematic representations. The packaging 22a is configured as a wiper blade packaging. The packaging 22a contains the wiper blade 40a and the product 24a. The packaging 22a comprises an outer packaging 44a. The outer packaging 44a is formed from fibrous material, namely paperboard, in a majority of at least 75% by weight.

The wiper blade 40a and product 24a are accommodated in the outer packaging 44a. In the present case, the packaging element 16a is configured as an inner packaging and/or accessory packaging. In the packaged state, the packaging element 16a configured as a wrap-around packaging comprises a plurality of wraps 50a. This simultaneously protects a rubber spoiler (not shown) of the wiper blade 40a against damage, which is accommodated along with the product 24a in the outer packaging 44a.

Figure 4:
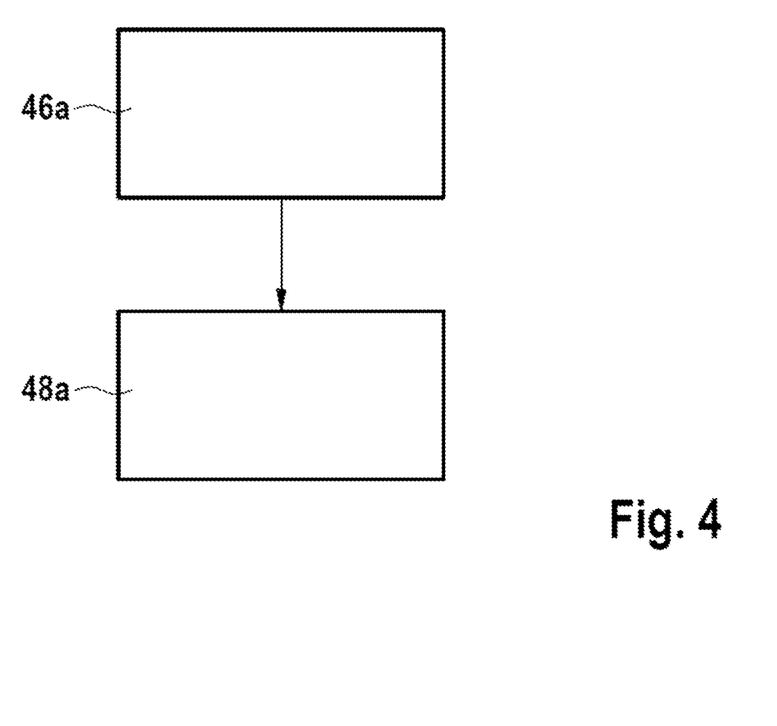

FIG. 4 shows a schematic method flowchart of a method for packaging the at least one item 12a with the packaging apparatus 10a. In the method, the item 12a is packaged by means of the user guide 18a. Similarly, by means of the method, the further items 26a, 30a, 34a can alternatively or additionally be packaged by means of the user guide 18a. The method comprises at least two method steps 46a, 48a. In a first method step 46a of the method, the packaging element 16a configured as a user guide 18a is spread out and the item 12a is loaded onto it. Alternatively or additionally, in the first method step 46a, one or more further items 26a, 30a, 34a can be placed on the user guide 18a. In a second method step 48a of the method, the item 12a is wrapped in the user guide 18a and then inserted into the closure element 38a. Alternatively or additionally, in the second method step 48a, one or more further items 26a, 30a, 34a can be wrapped in the user guide 18a and subsequently slid into the closure element 38a.

Figure 5:
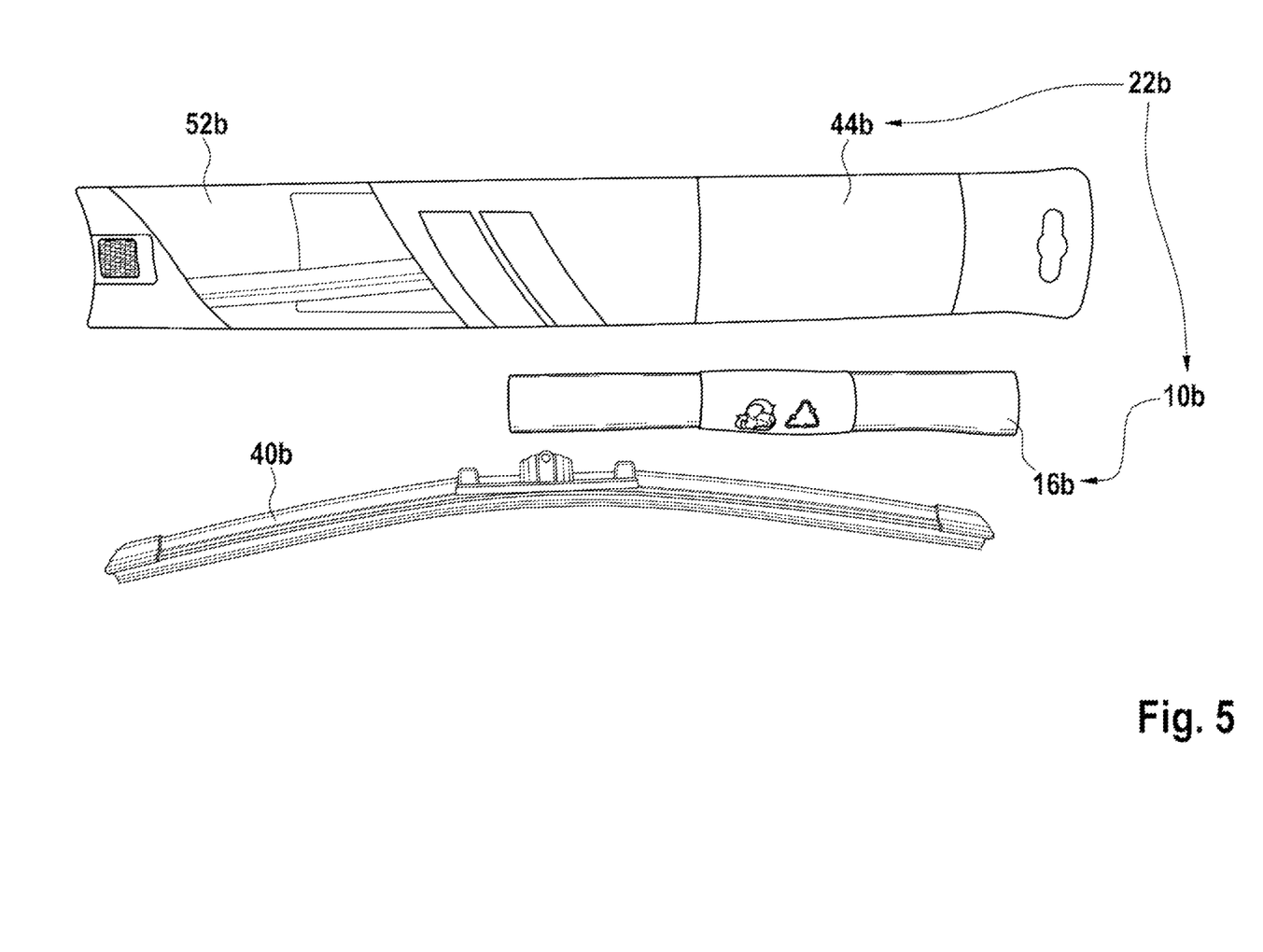

FIG. 5 shows a further exemplary embodiment of the invention. The following descriptions and the drawings are limited substantially to the differences between the exemplary embodiments, wherein reference can be made in principle also to the drawings and/or the description of the other exemplary embodiments, in particular of FIGS. 1 to 4, with respect to components bearing the same names, in particular with regard to components having identical reference numerals. In order to distinguish between the exemplary embodiments, the reference numerals of the exemplary embodiment in FIGS. 1 to 4 are followed by the letter a. In the exemplary embodiments of FIG. 5, the letter a is replaced with the letter b.

FIG. 5 shows a further exemplary embodiment of a packaging 22b in a schematic representation. The packaging 22b is configured as a wiper blade packaging. The packaging 22b includes a wiper blade 40b. The packaging 22b comprises a packaging apparatus 10b. The packaging apparatus 10b is provided for packaging at least one item (not shown) and namely at least one wiper blade adapter (not shown) for use with the wiper blade 40b. The packaging 22b differs substantially from the packaging 22a of the previous exemplary embodiment with respect to an outer packaging 44b. By contrast to the outer packaging 44a of the packaging 22a of the previous exemplary embodiment, the outer packaging 44b is formed from plastic and comprises a window 52b. With regard to the features of the packaging apparatus 10b, reference can otherwise be made to the above description of the packaging apparatus 10a from the previous exemplary embodiment.

What is claimed is:

1. A product comprising an outer packaging (44a), and flexible packaging element (16a; 16b) positioned within the outer packaging (44a) wherein the packaging element (16a; 16b) is a user guide (18a), wherein the product further includes a wiper blade adapter (14a, 28a, 32a, 36a), wherein the packaging element (16a; 16b) is wrapped at least once circumferentially around the wiper blade adapter (14a, 28a, 32a, 36a), wherein the product further includes a wiper blade (40a) positioned within the outer packaging (44a), wherein the wiper blade (40a) is disposed outside of the packaging element (16a; 16b).

2. The product according to claim 1, wherein the user guide (18a) is configured as an assembly guide (20a).

3. The product according to claim 1, wherein the outer packaging (44a) is at least partially formed from fibrous material.

4. The product according to claim 3, wherein a majority of the outer packaging (44a) is formed from fibrous material.

5. The product according to claim 3, wherein the packaging element (16a; 16b) is formed at least partially from paper.

6. The product according to claim 5, wherein a majority of the packaging element (16a; 16b) is formed from paper.

7. The product according to claim 1, wherein the packaging element (16a; 16b) extends at least twice circumferentially around the wiper blade adapter (14a, 28a, 32a, 36a).

8. The product according to claim 1, further comprising a closure element (38a) that seals the packaging element (16a; 16b), wherein the closure element (38a) at least partially wraps around the packaging element (16a; 16b) along a circumferential direction.

9. The product according to claim 8, wherein the user guide (18a) is configured as an assembly guide (20a), and wherein the closure element (38a) includes a printed reference to the assembly guide (20a).

10. The product according to claim 1, further comprising a further item (26a, 30a, 34a) that is accommodated in the packaging element (16a).

11. The product according to claim 10, wherein the wiper blade adapter (14a, 28a, 32a, 36a) and the further item (26a, 30a, 34a) are related items.

12. The product according to claim 10, wherein the further item (26a, 30, 34a) is a further wiper blade adapter (28a, 32a, 36a).

13. A method for packaging a wiper blade device, wherein the method includes wrapping a wiper blade adapter (14a, 28a, 32a, 36a) in a flexible packaging element (16a; 16b), and wrapping the packaging element (16a; 16b) at least once circumferentially around the wiper blade adapter (14a, 28a, 32a, 36a), wherein the packaging element (16a; 16b) is a user guide (18a), wherein the method further includes inserting the packaging element (16a; 16b) and the wiper blade adapter (14a, 28a, 32a, 36a) into an outer packaging (44a), wherein the method further includes inserting a wiper blade (40a) into the outer packaging (44a), wherein the wiper blade (40a) is disposed outside of the packaging element (16a; 16b).

14. The product according to claim 1, wherein the wiper blade adapter (14a, 28a, 32a, 36a) is a first wiper blade adapter, wherein the product includes a second wiper blade adapter, and wherein the packaging element (16a; 16b) is wrapped at least once circumferentially around both the first wiper blade adapter and the second wiper blade adapter.

* * * * *